(12) United States Patent
Wintz et al.

(10) Patent No.: US 10,796,278 B1
(45) Date of Patent: Oct. 6, 2020

(54) OPTIMIZING PALLET LOCATION IN A WAREHOUSE

(71) Applicant: Lineage Logistics, LLC, Irvine, CA (US)

(72) Inventors: Daniel Thomas Wintz, San Francisco, CA (US); Michael Lingzhi Li, Cambridge, MA (US); Elliott Gerard Wolf, Oakland, CA (US); Chloe Mawer, San Francisco, CA (US); Caitlin Voegele, San Francisco, CA (US); Zhou Daisy Fang, Durham, NC (US); Maya Ileana Choudhury, Winter Park, FL (US); Julia Long, Durham, NC (US); Sudarsan Thattai, Palos Verdes Estates, CA (US); Jeffrey Alvarez Rivera, Northville, MI (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 16/688,922

(22) Filed: Nov. 19, 2019

(51) Int. Cl.
*G06Q 10/08* (2012.01)
*G06Q 50/28* (2012.01)
(Continued)

(52) U.S. Cl.
CPC ......... *G06Q 10/087* (2013.01); *B65G 1/1371* (2013.01); *B65G 1/1373* (2013.01);
(Continued)

(58) Field of Classification Search
CPC ............. G06Q 10/087; G06Q 10/0833; G06Q 10/0838; G06Q 50/28; G06N 20/00; B65G 1/1371; B65G 1/1373
See application file for complete search history.

(56) References Cited

U.S. PATENT DOCUMENTS 10,504,061 B1 * 12/2019 Shi ....................... G06Q 10/087
2009/0082902 A1 * 3/2009 Foltz .................... G06Q 10/087
700/214

(Continued)

OTHER PUBLICATIONS

Bae, et al., "Acoustic scene classification using parallel combination of lstm and cnn," Proceedings of the Detection and Classification of Acoustic Scenes and Events 2016 Workshop (DCASE2106), 2016, pp. 11-15.

(Continued)

*Primary Examiner* — Florian M Zeender
*Assistant Examiner* — Whitney Poffenbarger
(74) *Attorney, Agent, or Firm* — Fish & Richardson P.C.

(57) ABSTRACT

A computer-based technology is provided to optimize a warehouse space, such as warehouse racks. The technology determines a storage duration of a pallet in a warehouse, and further determines an optimal storage location for the pallet in the warehouse. For example, the technology can determine how long an inbound pallet will stay in a warehouse, and locate an optimal area of the warehouse to store the pallet. Such an optimal pallet storage area is selected to reduce labor costs in transporting the pallet in, within, and out of the warehouse and further optimize the management of multiple pallets in the warehouse as a whole. In addition, the technology can consider the size of the pallet in determining the optimal storage location in the warehouse.

17 Claims, 10 Drawing Sheets

(51) Int. Cl.
 G06N 20/00 (2019.01)
 B65G 1/137 (2006.01)
(52) U.S. Cl.
 CPC ......... *G06N 20/00* (2019.01); *G06Q 10/0833* (2013.01); *G06Q 10/0838* (2013.01); *G06Q 50/28* (2013.01)

(56) References Cited

U.S. PATENT DOCUMENTS

| | | | | |
|---|---|---|---|---|
| 2013/0226649 | A1* | 8/2013 | Grissom | G06Q 10/087 705/7.25 |
| 2014/0343713 | A1* | 11/2014 | Ziegler | B65G 1/137 700/214 |
| 2017/0091704 | A1* | 3/2017 | Wolf | G06Q 10/087 |
| 2020/0034780 | A1* | 1/2020 | Sikka | B65G 1/137 |

OTHER PUBLICATIONS

Chen, et al., "Sequencing the storages and retrievals for flow-rack automated storage and retrieval systems with duration-of-stay storage policy," International Journal of Production Research, 2016, 54(4):984-998.

Chen, et al., "The storage location assignment and interleaving problem in an automated storage/retrieval system with shared storage," International Journal of Production Research, 2010, 48(4):991-1011.

Cho, et al., Learning phrase representations using RNN encoder-decoder for statistical machine translation, CoRR/abs/1406.1078, 2014.

Chung, et al., "Empirical evaluation of gated recurrent neural networks on sequence modeling," arXiv preprint arXiv:1412.3555, 2014.

Donahue, et al., "Long-term recurrent convolutional networks for visual recognition and description," CoRR, abs/1411.4389, 2014.

Dos Santos and Gatti, "Deep convolutional neural networks for sentiment analysis of short texts," Proceedings of COLING 2014, the 25th International Conference on Computational Linguistics: Technical Papers, 2014, pp. 69-78.

Goetschalckx and Ratliff, "Shared storage policies based on the duration stay of unit loads," Management Science, 1990, 36(9):1120-1132.

Hausman, et al., "Optimal storage assignment in automatic warehousing systems," Management Science, 1976, 22(6):629-638.

He, et al., Deep residual learning for image recognition, CoRR, abs/1512.03385, 2015.

Jaderberg, et al., "Reading text in the wild with convolutional neural networks," International Journal of Computer Vision, 2016, 116(1):1-20.

Johnson and Zhang, "Effective use of word order for text categorization with convolutional neural networks," arXiv preprint arXiv:1412.1058, 2014.

Johnson and Zhang, "Supervised and semi-supervised text categorization using lstm for region embeddings," arXiv preprint arXiv:1602.02373, 2016.

Kingma and Ba, "Adam: A method for stochastic optimization," arXiv preprint arXiv:1412.6980, 2014.

Kulturel, et al., "Experimental investigation of shared storage assignment policies in automated storage/retrieval systems," IIE Transactions, 1999, 31(8):739-749.

Malmborg, "Interleaving models for the analysis of twin shuttle automated storage and retrieval systems," International Journal of Production Research, 2000, 38(18):4599-4610.

Muppani and Adil, "Efficient formation of storage classes for warehouse storage location assignment: A simulated annealing approach," Omega, 2008, 36(4):609-618, Special Issue on Logistics: New Perspectives and Challenges.

Pennington, et al., "Glove: Global vectors for word representation," Empirical Methods in Natural Language Processing (EMNLP), 2014, pp. 1532-1543.

Petersen, et al., "Improving order-picking performance through the implementation of class-based storage," International Journal of Physical Distribution & Logistics Management, 2004, 34(7):534-544.

Rosenblatt and Eynon, "Note-deriving the optimal boundaries for class-based automatic storage-retrieval systems," Management Science, 1989, 35(12):1519-1524.

Schuster and Paliwal, "Bidirectional recurrent neural networks," IEEE Transactions on Signal Processing, 1997, 45(11):2673-2681.

Schwarz, et al., "Scheduling policies for automatic warehousing systems: Simulation results," AIIE Transactions, 1978, 10(3):260-270.

Srivastava, et al., "Dropout: a simple way to prevent neural networks from overfitting," The Journal of Machine Learning Research, 2014, 15(1):1929-1958.

Sutskever, et al., Generating text with recurrent neural networks, Proceedings of the 28th International Conference on Machine Learning (ICML-11), 2011, pp. 1017-1024.

Wang, et al., "End-to-end text recognition with convolutional neural networks," 21st International Conference on Pattern Recognition (ICPR), 2012, IEEE, 3304-3308.

Yu and Koster, "Designing an optimal turnover-based storage rack for a 3d compact automated storage/retrieval system," International Journal of Production Research, 2009, 47(6):1551-1571.

Yu and Koster, "On the suboptimality of full turnover-based storage," International Journal of Production Research, 2013, 51(6):1635-1647.

Yu, et al., "Class-based storage with a finite number of items: Using more classes is not always better," Production and Operations Management, 2015, 24(8):1235-1247.

Zhou, et al., "Text classification improved by integrating bidirectional lstm with two-dimensional max pooling," arXiv preprint arXiv:1611.06639, 2016.

\* cited by examiner

OPTIMIZING PALLET LOCATION IN A WAREHOUSE

TECHNICAL FIELD

This document describes devices, systems, and methods related to warehouse management by optimizing pallet locations in a warehouse.

BACKGROUND

Warehouses include warehouse racks to store pallets of goods. Pallets are generally flat transport structures that support goods in a stable matter and that are adapted to fit forklifts and/or other devices/machines to move the pallets. Packages of various products can be stacked on top of the pallets. Warehouses have been designed to permit forklifts to put and pull pallets from racks as needed. Forklifts and other sorts of vehicles move through a warehouse and transport pallets and packages.

Warehousing, including transportation and storage of pallets, is labor-intensive, and the labor costs take a large part of operating expenses of a warehouse. The process of reducing labor costs takes careful warehouse labor and occupancy planning, and balancing efficiency with maintaining a high level of customer service. Running an inefficient warehouse may result in bottlenecks in different processes, such as receipt, picking, and packing. For example, an inefficiently planned warehouse may cause workers, forklifts, and other vehicles to walk or run significantly long distances, taking longer time to complete the process.

SUMMARY

This document generally describes computer-based technology for optimizing a warehouse space, such as warehouse racks. Some embodiments of the technology determines a storage duration of a pallet in a warehouse, and further determines an optimal storage location for the pallet in the warehouse. For example, the technology can determine how long an inbound pallet will stay in a warehouse, and locate an optimal area of the warehouse to store the pallet. Such an optimal pallet storage area is selected to reduce labor costs in transporting the pallet in, within, and out of the warehouse and further optimize the management of multiple pallets in the warehouse as a whole. In a simple example, the technology can determine that a pallet to be stored in a warehouse is likely to stay for a relatively short period of time (e.g., a couple of days), and then identify a part of warehouse area that is close to an pickup area (e.g., an entrance of the warehouse) from which the pallet is delivered to the warehouse area, thereby reducing a transportation distance of the pallet. On the other hand, if a new pallet is determined to likely stay for a relatively long period of time (e.g., a few months), the technology can determine a part of warehouse area that is rather far from the pickup area, thereby permitting for the other part of warehouse area to remain available for pallets with shorter storage durations so that such pallets with shorter storage durations are carried over shorter distances, thereby reducing overall labor costs.

Storage durations of pallets are not typically deterministic due to a variety of dynamic factors, such as suppliers, customers, different storage and/or delivery requirements, seasonality of products, regions, timing of storage and delivery, etc. Some embodiments of the technology are configured to predict an expected duration during with an inbound pallet will be stored in a warehouse. Such prediction can be performed using a machine learning algorithm based on a variety of available data, vitals, and statistics. When an expected storage duration of a pallet is predicted, the technology can determine an optimal area of the warehouse (e.g., a location or section of warehouse racks) to which the pallet will be allocated. Various machine learning algorithms can be used for prediction. Some example machine learning algorithms used for prediction employ artificial neural networks, which can include an input layer for receiving inputs (e.g., a variety of factors described herein), one or more middle layers for processing the inputs, and an output layer for generating pallet storage durations (e.g., percentiles).

In some implementations, the technology described herein can predict a percentile of an inbound pallet for storage duration in the warehouse. For example, a lower storage percentile of a pallet (e.g., the $10^{th}$ percentile) may indicate that the pallet stays a shorter period of time (e.g., 10 days) than a pallet with a higher storage percentile (e.g., the $90^{th}$ percentile, which may indicate 6 month of storage in the warehouse, by way of example).

A variety of factors can be used to predict a storage duration of a pallet. For example, historical data about storage of pallets of the same or similar kind and/or pallets for the same or similar customer can be used for prediction of a storage duration of a particular pallet. In addition or alternatively, historical data for pallets of different kind and/or pallets for different customers can be used for prediction. In one example, historical performance of pallet storage for the same customer and/or different customers over time can be considered to generate prediction of a storage duration of a particular pallet to be stored in the warehouse. Although different customers may have different requirements for pallet storage and transportation, the pallet storage and/or transportation for different customers can show a pattern associated with attributes of the pallets (e.g., types of products in the pallets), and such a pattern can be used to predict a storage duration of a particular pallet (e.g., a storage percentile of the pallet). By way of example, pallets of strawberry products, regardless of whether they are for the same or different customers, may be treated, stored, and distributed similarly to maintain freshness under certain circumstances.

Further, the factors used to predict a pallet storage duration can include facility, customer, product types, timing (e.g., day of the week, week of the year, etc.) in which pallets come in the warehouse, item description, seasonality, and other suitable information. At least some of the factors may be identified from a stock keeping unit (SKU). In some implementations, an item description for the product in the pallet (e.g., "6 ounce strawberry puree") can be parsed to a machine-understandable language using, for example, natural language processing so that the item description can be used to predict a storage duration of the pallet in the warehouse.

Some embodiments of the technology can determine an optimal location of the warehouse that corresponds to the storage duration (e.g., a percentile) of the pallet based on predetermined rules that map pallets storage durations (e.g., percentiles) to areas of the warehouse (e.g., sections of warehouse racks). For example, a plurality of storage racks in the warehouse have a plurality of sections corresponding to ranges of pallet storage durations. The plurality of sections in each storage rack can be arranged by distance from an area (e.g., a docking area) from which pallets are delivered to the storage rack. By way of example, a storage rack can have multiple sections having a far-front section, a far-end section, and one or more middle sections. The far-front section is closest to the entrance of the warehouse and used to store pallets having relatively short storage durations (e.g., 0-10 days, or 0-5 percentile of storage duration). The far-end section is farthest to the entrance of the warehouse and used to store pallets having relatively long storage durations (e.g., 4-6 months or longer, or 90-100 percentile of storage duration). The middle sections can be arranged between the far-front section and the far-end section, and split to be used for pallets of different ranges of storage durations between the ones for the far-front section and the ones for the far-end section.

Some embodiments of the technology can also consider a dimension (e.g., a height) of an inbound pallet to determine an optimal storage location for the pallet in a warehouse, such as a warehouse that includes a plurality of storage racks with a plurality of heterogeneous rack openings configured to receive pallets with different dimensions (e.g., heights). The optimal storage location for an inbound pallet can be determined in a way to optimize labor cost saving and space utilization, which do not necessarily coincide especially where the warehouse storage racks have different sizes of rack openings. For example, a storage location of a pallet that matches a storage duration of the pallet is not necessarily identical to a storage location that would provide maximum space utilization of the warehouse. In a simple example, a pallet may be determined to be best located in a third column of the warehouse rack from its front based on the pallet's expected storage duration, but the third column may not have a rack opening that fits the size (e.g., height) of the pallet. In this instance, another rack column and/or opening needs to be determined which is optimized with respect to both the storage duration and the pallet size.

In some implementations, an optimal storage location for a pallet can be determined using a cost function that reflects matching (or degrees thereof) on pallet storage duration and pallet size. For example, the technology can identify a plurality of candidate rack openings that are available (e.g., the rack openings that are not occupied), and calculate an optimization value (e.g., score) for each candidate rack opening based on the storage duration and the size of the pallet. The optimization value can be calculated using a duration match value (e.g., score) and a size match value (e.g., score). The duration match value can represent how close the candidate rack opening matches the pallet in terms of the pallet's storage duration (e.g., percentile). The size match value can represent how close the candidate rack opening matches the pallet in terms of the pallet's size (e.g., height).

In some implementations, the duration match value and the size match value can be complementarily weighted, which can be adjusted to meet different needs, such as needs to save labor costs more, or needs to increase the usage (e.g., occupancy) of the warehouse racks. For example, if the size match value is more weighted than the duration match value, the occupancy of the warehouse can increase by fitting pallets to rack openings with matching sizes (without having to place small pallets to larger rack openings to waste the remaining space therein). On the other hand, if the duration match value is more weighted than the size match value, the labor costs can be saved more by placing pallets to predetermined corresponding sections of the warehouse racks.

Some embodiments of the technology can determine an occupancy of the warehouse (e.g., warehouse racks), and scale the effective space of the warehouse based on the occupancy. By way of example, if the warehouse is expected to be occupied only 50%, the sections of the warehouse, in which pallets are allocated based on their storage durations and/or sizes, can be selected to be located within only a desired portion (e.g., the front half close to the entrance) of the warehouse that is a 50% of the entire space of the warehouse, so that the warehouse is effectively treated as a half size of the warehouse.

Particular embodiments described herein include a system for managing a plurality of pallets in a warehouse. The system may include a plurality of storage racks having a plurality of rack openings, a database that is programmed to store pallet allocation data that associate expected durations of pallets with a plurality of sections of the storage racks, and a computer system including one or more processors that are programmed to perform operations. The operations may include one or more of the following processes: identifying a pallet delivered to the warehouse; determining an expected storage duration of the pallet in the warehouse; determining a storage location of the pallet in the warehouse based on the expected duration of storage; and transmitting information identifying the storage location to equipment for placement of the pallet.

In some implementations, the system can optionally include one or more of the following features. Determining an expected storage duration of the pallet may include determining a duration percentile of the pallet. The expected storage duration of the pallet may be determined based on historical inventory data. The historical inventory data may identify pallets stored in the warehouse, times at which the pallets were stored, and durations in which the pallets were stored. Determining an expected storage duration of the pallet may include predicting the expected storage duration using a machine learning based on a plurality of input factors. The input factors may include at least one of a type of items contained in the pallet, a customer of the pallet, a day of week, a week of year, a pallet description, an item description, and historical inventory data. Determining a storage location of the pallet in the warehouse may include determining an area of the warehouse based on a travel distance of the pallet, the travel distance corresponding to the expected duration of storage. Determining a storage location of the pallet in the warehouse may include determining an area at a distance from an entrance of the warehouse based on the expected duration of storage. The plurality of sections may be arranged by distance from an entrance of the warehouse. The plurality of sections may be mapped to different pallet duration percentiles. The expected storage duration may be identified as a first pallet duration percentile of the pallet duration percentiles. The storage location may be a first section of the plurality of sections, the first section being mapped to the first pallet duration percentile. The plurality of sections may include a first section and a second section being arranged farther from the entrance of the warehouse than the first section, the first section mapped to a first percentile, and the second section mapped to a second percentile greater than the first percentile. The warehouse may include a plurality of storage racks. Each rack may have the plurality of sections, and the plurality of sections may be mapped to different pallet duration percentiles. The plurality of storage racks may include one or more horizontal bars adjustable along a plurality of elevations on the storage racks to define a plurality of rack openings within the storage racks. The operations may include determining a height of the pallet. Determining a storage location of the pallet in the warehouse may include determining one of the plurality of sections in the storage racks and one of the rack openings in the storage racks based on a cost function of the expected duration of storage and the height of the pallet. The operations may include determining a height of the pallet, identifying a plurality of candidate rack openings that are available in the storage racks, calculating optimization values for the candidate rack openings based on the expected duration of storage and the height of the pallet, and determining a rack opening from the candidate rack openings having an optimization value exceeding a threshold value, the rack opening being the storage location for the pallet. Each of the optimization values may include a combination of a duration match value and a height match value for each of the candidate rack openings. The duration match value for a candidate rack opening may represent proximity between a section of the storage racks suited for the expected storage duration of the pallet and a section of the storage racks to which the candidate rack opening belongs. The height match value for the candidate rack opening may represent proximity between the height of the pallet and a height of the candidate rack opening. The duration match value and the height match value may be complementarily weighted. The equipment may include a forklift that includes a user interface programmed to automatically output the information identifying the storage location in response to receiving the transmitted information.

Particular embodiments described herein include a method for managing a plurality of pallets in a warehouse. The method may include identifying a pallet delivered to the warehouse, determining an expected storage duration of the pallet in the warehouse, determining a storage location of the pallet in the warehouse based on the expected duration of storage, and transmitting information identifying the storage location to equipment for placement of the pallet.

In some implementations, the method can optionally include one or more of the following features. The warehouse may include a plurality of sections arranged by distance from an entrance of the warehouse. The plurality of sections may be mapped to different pallet duration percentiles. The expected storage duration may be identified as a first pallet duration percentile of the pallet duration percentiles. The storage location may be a first section of the plurality of sections. The first section may be mapped to the first pallet duration percentile. The plurality of sections may include a first section and a second section being arranged farther from the entrance of the warehouse than the first section. The first section may be mapped to a first percentile, and the second section may be mapped to a second percentile greater than the first percentile. The warehouse may include a plurality of storage racks. Each rack may have the plurality of sections. The plurality of sections may be mapped to different pallet duration percentiles. The plurality of storage racks may include one or more horizontal bars adjustable along a plurality of elevations on the storage racks to define a plurality of rack openings within the storage racks. The method may further include determining a height of the pallet. Determining a storage location of the pallet in the warehouse may include determining one of the plurality of sections in the storage racks and one of the rack openings in the storage racks based on a cost function of the expected duration of storage and the height of the pallet. The method may further include determining a height of the pallet, identifying a plurality of candidate rack openings that are available in the storage racks, calculating optimization values for the candidate rack openings based on the expected duration of storage and the height of the pallet, and determining a rack opening from the candidate rack openings having an optimization value exceeding a threshold value, the rack opening being the storage location for the pallet. Each of the optimization values may include a combination of a duration match value and a height match value for each of the candidate rack openings. The duration match value for a candidate rack opening may represent proximity between a section of the storage racks suited for the expected storage duration of the pallet and a section of the storage racks to which the candidate rack opening belongs. The height match value for the candidate rack opening may represent proximity between the height of the pallet and a height of the candidate rack opening. The duration match value and the height match value may be complementarily weighted.

The devices, system, and techniques described herein may provide several advantages. For example, some embodiments of the technology provides a solution to determine or predict storage durations of pallets (e.g., pallet velocities) based on a variety of factors, and select areas of warehouse racks or other pallet storage location which can optimize pallet travel times and distances in transporting the pallets in and out of the areas and thus save labor costs in managing the facility. Further, some embodiments of the technology can further provide a solution to increase space utilization of the warehouse racks or other pallet storage location by taking into account the sizes of the pallets and the sizes of the rack openings available for the pallets. The technology can determine rack openings that can optimally fit the pallets in terms of their sizes and further meet the storage durations of the pallets in a way to balance often-incompatible needs for saving labor costs and maximizing facility space usage.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, this document describes computer-based techniques for optimizing storage locations at a storage facility (e.g., a warehouse) and directing the putaway of inbound pallets to optimal locations at the storage facility, such as optimal locations in storage racks.

Figure 1:
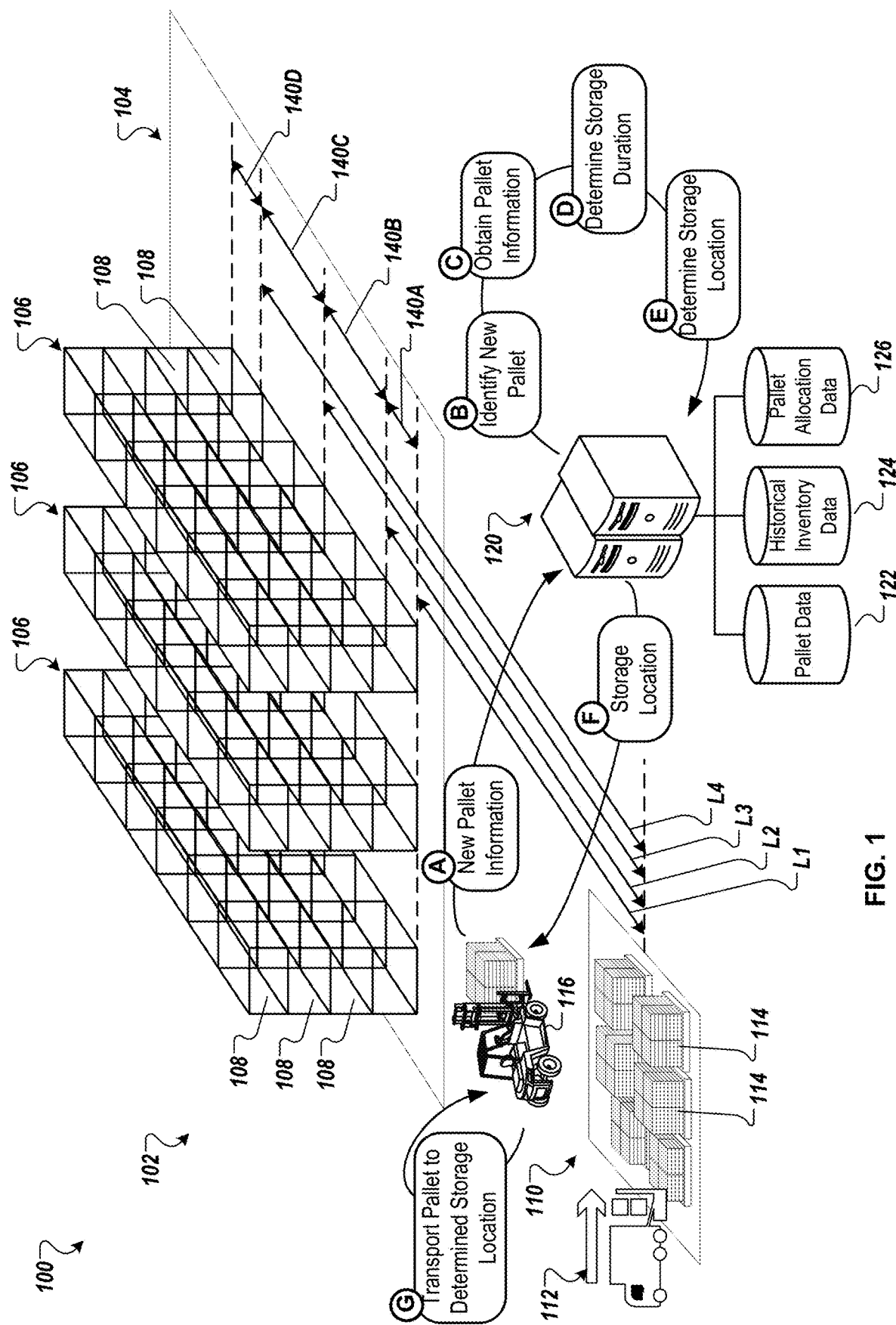
FIG. 1 illustrates an example system for optimizing pallet storage locations in a warehouse.

FIG. 1 illustrates an example system 100 for optimizing pallet storage locations in a warehouse 102. The warehouse 102 can include a pallet storage area 104 for storing pallets. The pallet storage area 104 can include a plurality of warehouse racks 106 having rack openings 108 configured to receive pallets for storage. In this example, at least some of the warehouse racks 106 are homogeneous warehouse racks which have the rack openings of the same size. The warehouse 102 can further include a loading area 110 from which pallets 114 are delivered to the pallet storage area 104 or the warehouse racks 106. The loading area 110 may be a loading dock or bay (or an area close to the loading dock or bay) where pallets are unloaded from, or loaded onto, vehicles 112, such as trucks, trains, or other suitable vehicles. The loading area 110 may be other areas in or outside the warehouse, which pallets are temporarily placed before delivered to the pallet storage area 104 or the warehouse racks 106. The pallets 114 can be transported from the loading area 110 using various methods. In one example, forklifts 116 can be operated to pick up a pallet 114 and transport the pallet to a desired location in the pallet storage area 104 or a desired rack opening 108 of a storage rack 106.

The example system 100 further includes a computer system 120 that is programmed to determine optimal locations for pallet storage in the pallet storage area 104 (e.g., rack openings in the warehouse racks 106) based at least in part on pallet data 122 and/or historical inventory data 124. The pallet data 122 include information of pallets to be stored in the pallet storage area 104, such as type of items in pallets, item description, pallet description, customers, facilities, timing (e.g., day of the week, week of the year, etc.) in which pallets come in the warehouse, seasonality, etc.

The historical inventory data 124 include historical data about pallets (e.g., pallets of the same or similar kind and/or pallets of different kinds) which have been delivered in and out, and stored in, the pallet storage area 104 over time. The historical inventory data 124 can include, for example, historical performance of pallet storage for the same customer and/or different customers over time can be considered to generate prediction of a storage duration of a particular pallet to be stored in the warehouse. Different customers may have different requirements for pallet storage and transportation. However, the pallet storage and/or transportation for different customers can show a pattern associated with attributes of the pallets (e.g., types of products in the pallets). By way of example, pallets of strawberry products, regardless of whether they are for the same or different customers, may be treated, stored, and distributed similarly to maintain freshness under certain circumstances.

The computer system 120 can determine an expected duration in which a pallet, such as a pallet 114 at the loading area 110, is stored in the pallet storage area 104 (e.g., a warehouse rack 106). The computer system 120 can use the pallet data 122 and/or the historical inventory data 124 to determine an expected pallet storage duration of a particular pallet, which can represent how long the pallet will stay for storage in the pallet storage area 104, or how soon the pallet will be removed from the pallet storage area 104 after being placed in the pallet storage area 104 (i.e., a pallet velocity).

The computer system 120 can use pallet allocation data 126 to determine optimal locations to store pallets in the pallet storage area 104. The pallet allocation data 126 can include rules for allocating identified pallets to desired locations (e.g., rack openings) in the pallet storage area 104. As described herein, the pallet allocation data 126 can include information that maps expected storage durations to the pallet storage area 104.

For example, the pallet allocation data 126 include information (e.g., a data table) that associates different pallet storage durations with different sections of the warehouse racks 106 in a way to reduce labor costs for transporting pallets to and from the warehouse racks 106. As illustrated in FIG. 1, the warehouse racks 106 can have different sections 140 (such as 140A-D) that are divided and arranged at different distances L (such L1-L4) from the source of pallets (e.g., the loading area 110). For example, first, second, third, and fourth sections 140A-D of the warehouse racks 106 are arranged at first, second, third, and fourth distances L1-L4, respectively, from the loading area 110 with the first section 140A being arranged closest to the loading area 110 and the fourth section 140D being arranged farthest from the loading area 110. The pallet allocation data 126 provides assignment of the first, second, third, and fourth sections 140A-D to different ranges of pallet storage durations, such as 0-10 day storage, 10-30 day storage, 30-90 day storage, and 90-200 day storage, respectively. In this example, therefore, based on the pallet allocation data 126, an inbound pallet that is determined to have a storage duration of 3 days will be assigned to the first section 140A. Similarly, this example of the pallet allocation data 126 assigns a pallet having a storage duration of 120 days to the fourth section 140D. While the warehouse racks 106 are illustrated to have four sections 140 herein, the warehouse racks 106 can have less than or more than four sections. In some implementations, the warehouse racks 106 can have 100 sections or more so that each integer percentile of pallet storage duration has its own category and assignment to one or more sections of the warehouse racks. By way of example, 5th percentile pallets can be stored in any of one or more sections corresponding to such pallets in a way that the pallets can turn more quickly than higher percentile (e.g., 50th percentile) pallets. In this way, the same percentile pallets do not always need to be stored in the same location of rack.

The computer system 120 can include a server system, cloud-based computer system, desktop, laptop, mobile computing device, other computing device/system. In some implementations, the computer system 120 can be configured as a Warehouse Management System (also referred to as "WMS") that is a specialized computer system to manage storage and retrieval of inventory at the facility, and to interface with devices and components within the facility, such as forklifts, sensors, HVAC systems, lighting systems, and/or other devices and components. For example, the WMS can determine where pallets arriving at the facility should be placed (e.g., identifying rack opening for pallets), manage and track the locations of pallets, identify pallets that should be removed for shipment out of the facility, and communicate with forklifts (and other devices) to provide pick and place information for pallets.

Referring still to FIG. 1, the system 100 can identify the characteristics of pallets that are to be stored in a warehouse, determine optimal storage locations of the pallets in the warehouse, and transport the pallets to the determined storage locations for storage. For example, the computer system 120 can receive information about a new pallet 114 (Step A). In some implementations, the information about the new pallet 114 can be transmitted from a forklift 116 (or other vehicle) that picks up the new pallet for transportation. The new pallet 114 or the items thereon (e.g., a SKU) can be scanned before or after it is picked up by the forklift 116, and the scanned information can be transmitted to the computer system 120. In other implementations, the new pallet information can be obtained in other ways, such as provided by a supplier of the new pallet when the new pallet is delivered to the warehouse.

The computer system 120 can identify the new pallet 114 based on the received new pallet information (Step B). The computer system 120 can obtain pallet information about the new pallet 114 (Step C). For example, the computer system 120 can retrieve the pallet information from the pallet data 122. The pallet information includes facility, customer, product types, timing (e.g., day of the week, week of the year, etc.) in which pallets come in the warehouse, item description, seasonality, and other suitable information.

The computer system 120 can determine an expected storage duration of the new pallet 114 (Step D). The expected storage duration of the new pallet 114 can be determined based at least in part on the pallet information (e.g., the pallet data 122) and/or the historical inventory data associated with the warehouse. The computer system 120 can determine an optimal storage location according to the expected storage duration of the new pallet 114 (Step E). The optimal storage location can be determined using the pallet allocation data 126 that can identify a section of the warehouse rack that corresponds to the expected storage duration of the new pallet 114. The computer system 120 can transmit the optimal storage location to the forklift 116 (Step F), and the forklift 116 can transport the new pallet 114 and place it to the optimal storage location (e.g., the determined section of the warehouse rack) (Step G).

Figure 2:
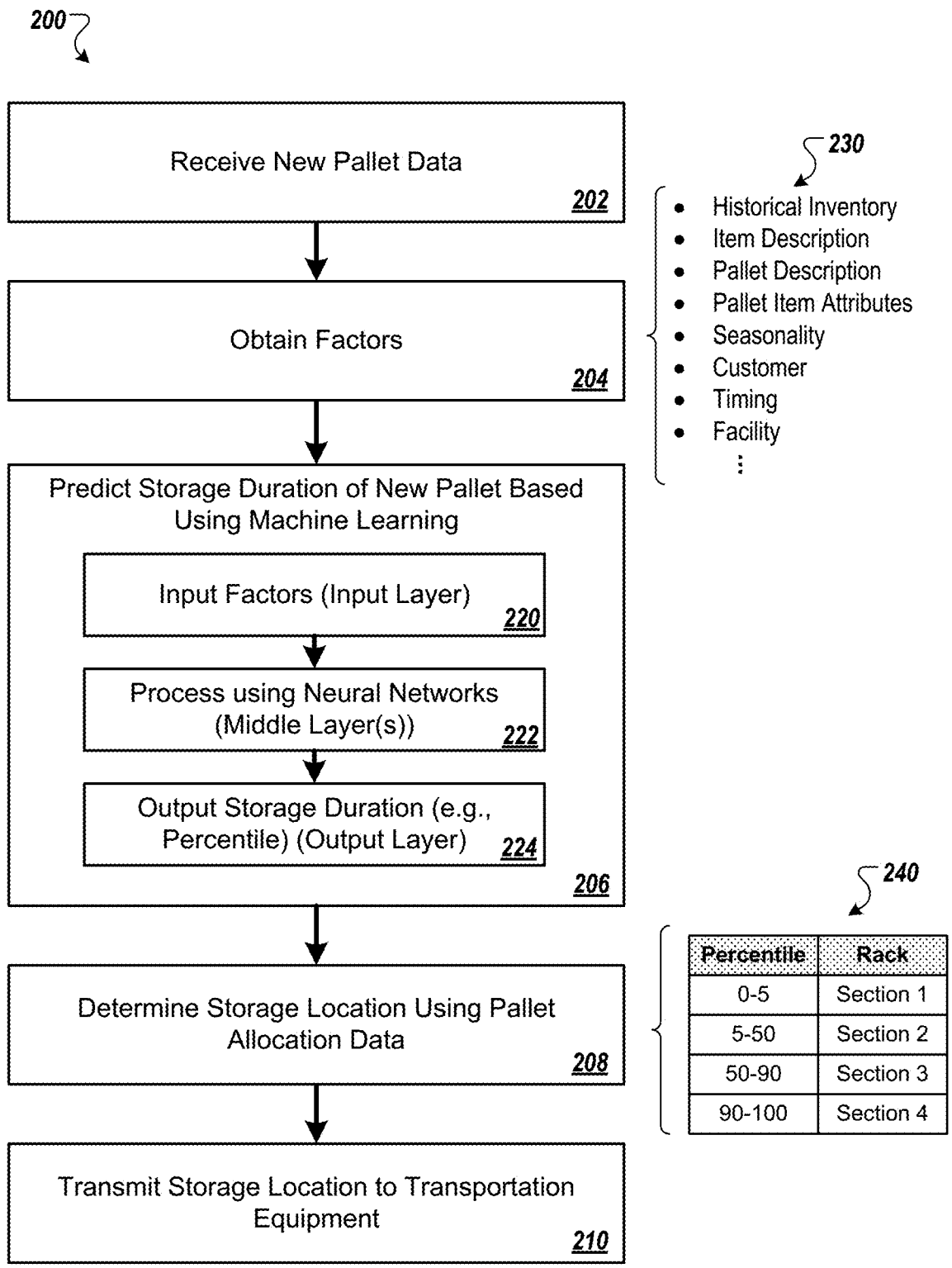
FIG. 2 is a flowchart of an example process for determining an optimal storage location of a pallet in a warehouse and placing it in the determined location.

FIG. 2 is a flowchart of an example process 200 for determining an optimal storage location of a pallet in a warehouse, and placing it in the determined location. The process 200 can begin by receiving new pallet data (Block 202). The new pallet data can be used to identify a new pallet that needs to be stored in a warehouse. The new pallet data can be provided by a supplier of the new pallet as the pallet is transported to the warehouse. Alternatively, the new pallet data can be obtained manually (e.g., by a worker who identifies the new pallet and enters information about the pallet (e.g., a SKU) via a terminal that is communicatively connected to one or more computing devices, such as the computer system 120. Alternatively, the new pallet data can be obtained by scanning the pallet (e.g., scanning the barcode on the pallet) before or while the new pallet is moved by a forklift or other suitable vehicles in the warehouse. The new pallet data can be saved as the pallet data 122 in FIG. 1.

The process 200 can further include obtaining a variety of factors 230 associated with the new pallet (Block 204). The factors include one or more of historical inventory information, pallet item attributes (e.g., product types, seasonality, etc.), customer of the pallet, timing information (e.g., day of the week, week of the year, etc. in which the pallet is delivered in and out the warehouse), facility information (e.g., type of facility, operational conditions, etc.), pallet description, pallet item description, and other relevant information.

Historical inventory information can include information storage of pallets of the same or similar kind and/or pallets for the same or similar customer over a predetermined period of time in the past, or over the entire time of storage at the facility in the past. In addition or alternatively, the historical inventory information can include historical data for pallets of different kind and/or pallets for different customers can be used for prediction. Historical performance of pallet storage for the same customer and/or different customers over time can be considered to generate prediction of a storage duration of a particular pallet to be stored in the warehouse.

Item description can indicate a human-readable description about items in the pallet, such as "6 ounce strawberry puree." The item description can be parsed to a machine-understandable language using, for example, natural language processing so that the item description can be used to predict a storage duration of the pallet in the warehouse.

The process 200 can include predicting an expected storage duration of the new pallet (Block 206). For example, the expected storage duration can be predicted using a machine learning algorithm. Various machine learning algorithms can be used for prediction. Some example machine learning algorithms used for prediction employ artificial neural networks with multiple layers, such as an input layer, one or more middle layers, and an output layer. In some implementations, prediction of the expected storage duration can be performed by the input layer that receives a variety of factors associated with the new pallet as inputs (Block 220), the middle layers that process the inputs (Block 222), and the output layer that generates a storage duration of the pallet (Block 224). As described herein, the storage duration of the pallet can be represented as a percentile of the pallet for storage duration in the warehouse. In some implementations, the process 200 can predict a distribution for the set of input data (e.g., input factors), randomly sample from the distribution, and then convert to a percentile after ranking that duration relative to durations of other pallets in the room.

The process 200 can include determining an optimal storage location that corresponds to the predicted storage duration based on pallet allocation data 240 (Block 208). The pallet allocation data 240 can be saved as the pallet allocation data 126 in FIG. 1. In some implementations, the pallet allocation data 240 provide rules as a table that maps ranges of pallet storage durations (e.g., percentiles) with storage locations (e.g., sections of a rack). By way of example, if a new pallet is predicted to have 25 percentile of storage duration, the new pallet is determined to be placed in Section 2 of the rack, using the illustrated pallet allocation data 240.

While the pallet allocation data 240 is illustrated herein to have four sections 140 for four different percentile ranges, the warehouse racks 106 can be divided up into a large number of smaller sections (e.g., 100 or more smaller sections for each rack) so that the sections of the racks are arranged to be continuous per corresponding percentiles of pallets, and allocations of pallets to the sections are flexible. In some implementations, a warehouse rack can have 100 sections or more so that each integer percentile of pallet storage duration has its own category and assignment to one or more sections of the rack. By way of example, 5th percentile pallets can be stored in any of one or more sections corresponding to such pallets in a way that the pallets can turn more quickly than higher percentile (e.g., 50th percentile) pallets. In this way, the same percentile pallets do not always need to be stored in the same exact location of rack.

The process 200 can include transmitting the determined storage location to transportation equipment, such as a forklift, so that the new pallet is transported and placed to the determined storage location for storage in the warehouse (Block 210).

Figure 3:
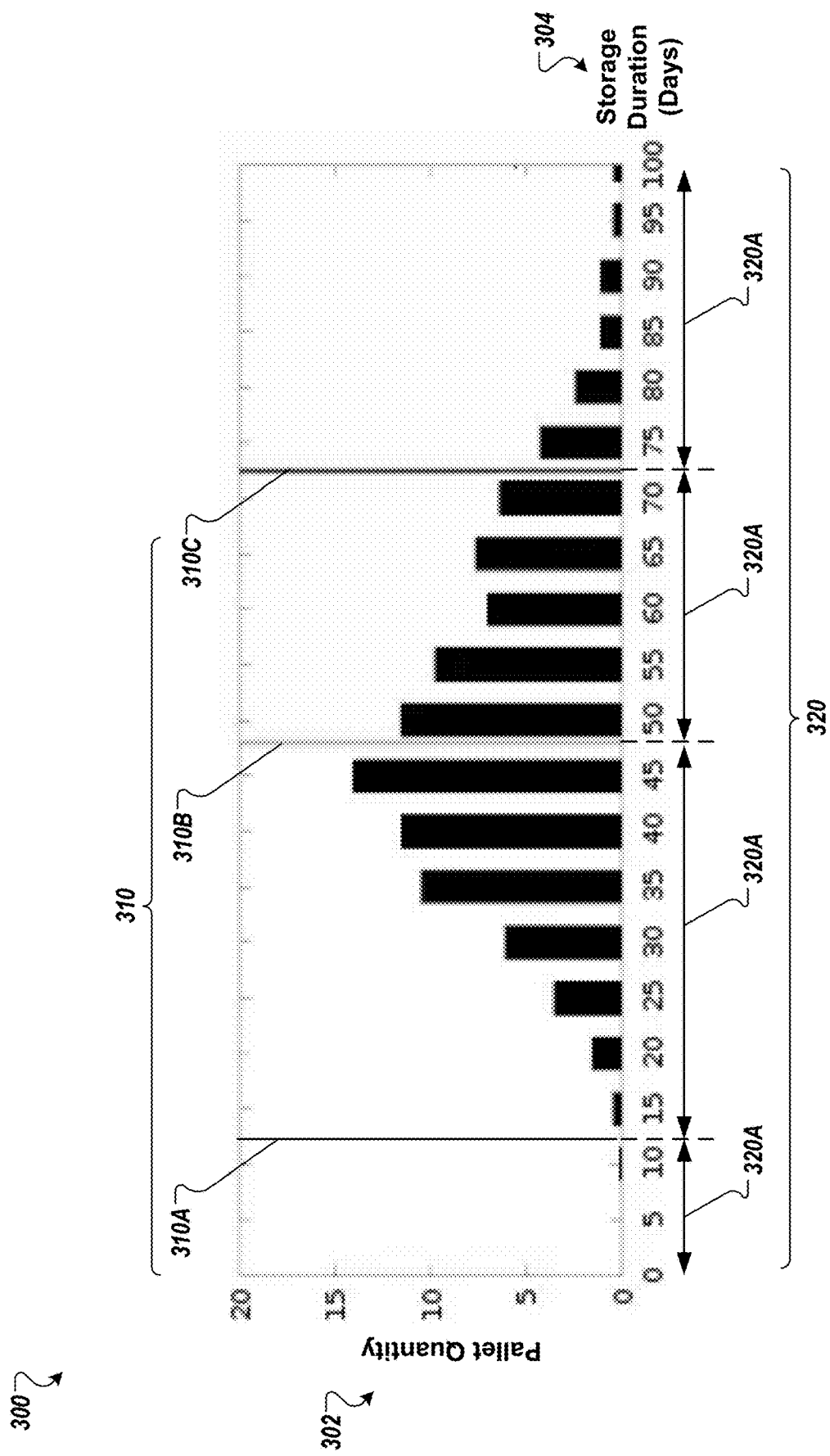
FIG. 3 illustrates an example chart that shows a distribution of pallets with different storage durations.

FIG. 3 illustrates an example chart 300 that shows a distribution of pallets with different storage durations. The chart 300 shows a number of pallets 302 (in a vertical axis) for different storage durations 304 (in a horizontal axis). The chart 300 further shows example percentiles 310 and multiple percentile ranges 320. For example, the chart 300 depicts example percentiles (e.g., a first percentile 310A, a second percentile 310B, and a third percentile 310C), and example percentile ranges (e.g., a first range 320A, a second range 320B, a third range 320C, and a fourth range 320D). By way of example, if a new pallet is predicted to have a storage duration of 23 days, the storage duration of the new pallet is between the first percentile 310A and the second percentile 310B, thereby falling within the second range 320B.

The extent of storage durations for determining percentiles can be determined at various points of time. In one example, the percentile of a new pallet can be determined based on the entire pallets that are stored in the storage area (e.g., the warehouse racks) at the time that the new pallet is identified to be stored in the storage area. Alternatively, the percentile of a new pallet can be determined based on the pallets that have been historically stored in the storage area over either the entire time of operating the warehouse or a predetermined period of time. Alternatively, the percentile of a new pallet can be determined based on an expected future inventory of pallets, such as at a predetermined future time after the new pallet is identified to be stored in the storage area.

Figure 4:
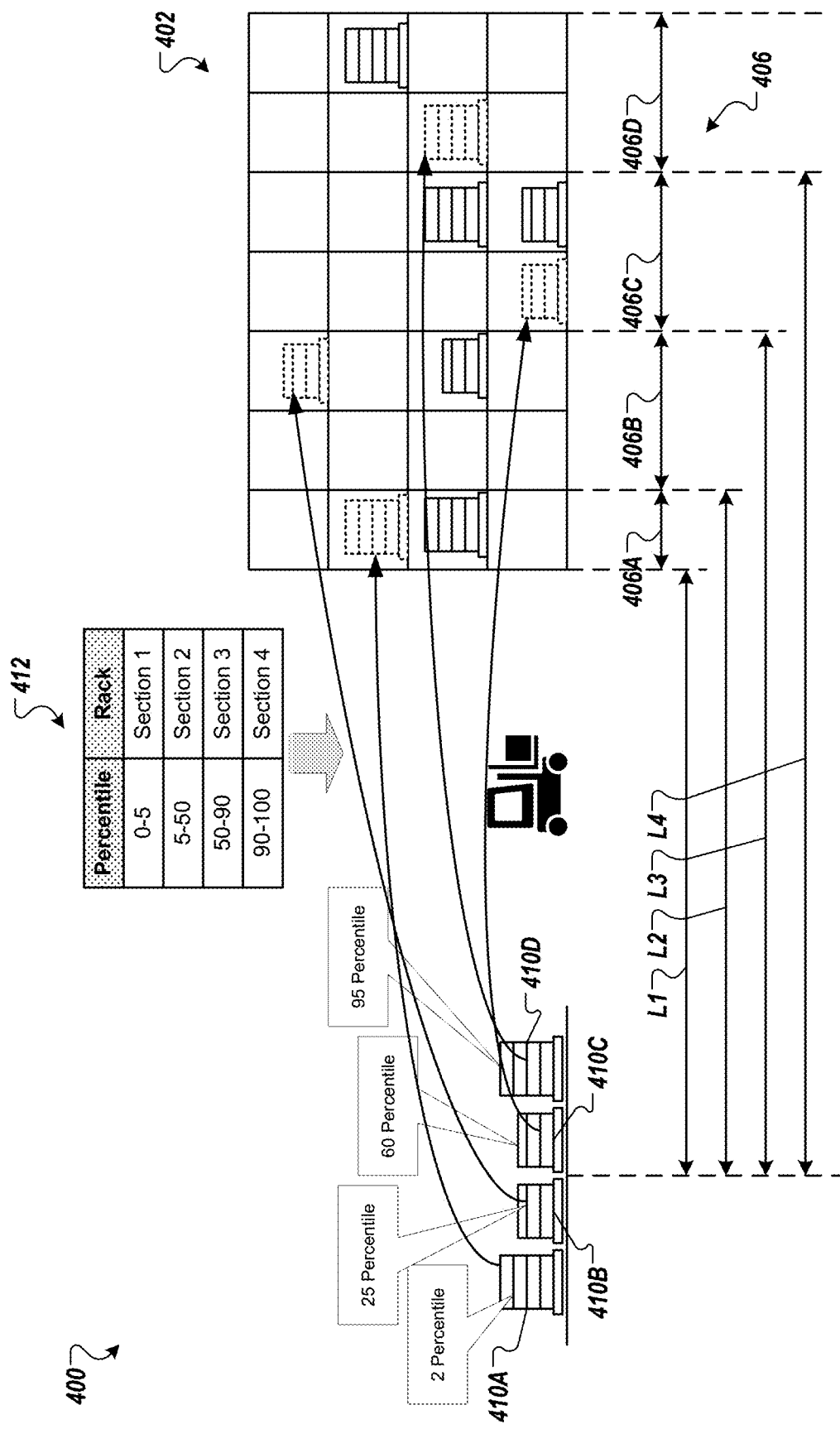
FIG. 4 illustrates an example process for determining an optimal storage location of a new pallet based on an expected storage duration of the new pallet.

FIG. 4 illustrates an example process 400 for determining an optimal storage location of a new pallet based on an expected storage duration of the new pallet. In this example, a storage rack 402, as presented in its side view, is arranged such that each rack opening 404 has the same size, as indicated by the consistent shelf height across the length of the rack. The storage rack 402 has a plurality of sections 406 (including 406A-D) arranged at different distances from a loading area 408 where pallets 410 are ready to be transported to the storage rack 402. In the illustrated example, the storage rack 402 has four sections arranged by distance from the loading area 408. In particular, first, second, third, and fourth sections 406A-D are arranged at first, second, third, and fourth distances L1-L4, respectively, from the loading area 408. The first distance L1 is shorter than the second distance L2, the second distance L2 is shorter than the third distance L3, and the third distance L3 is shorter than the fourth distance L4.

Each of the rack sections 406 is assigned to a particular range of pallet storage duration. Such assignment can be predetermined and stored as pallet allocation data or rules 412 (e.g., the pallet allocation data 240). In some implementations, a short storage duration of a pallet indicates a short turnaround of the pallet (e.g., the pallet is delivered in and out of the warehouse within a short period of time). Thus, a shorter storage duration can be mapped to a rack section 406 that is closer to the loading area 408 so that racks with quicker turnaround can be stored closer to the loading area 408, thereby saving labor costs in delivering in and out of the warehouse rack. By way of example, as illustrated, the first section 406A is assigned to a pallet storage duration between 0 and 5 percentile, the second section 406B is assigned to a pallet storage duration between 5 (including 5) and 50 percentile, the third section 406C is assigned to a pallet storage duration between 50 (including 50) and 90 percentile, and the fourth section 406D is assigned to a pallet storage duration between 90 (including 90) and 100 percentile.

The pallets 410 that are delivered from the loading area 408 can be identified, and an expected storage duration of each pallet is determined as described herein. In the illustrated example, a first pallet 410A is determined to have a storage duration of 2 percentile, and thus is delivered and stored in the first section 406A of the rack 402. A second pallet 410B is determined to have a storage duration of 25 percentile, and thus is stored in the second section 406B of the rack 402. A third pallet 410C is determined to have a storage duration of 60 percentile, and thus is stored in the third section 406C of the rack 402. A fourth pallet 410D is determined to have a storage duration of 95 percentile, and thus is stored in the fourth section 406D of the rack 402.

Figure 5:
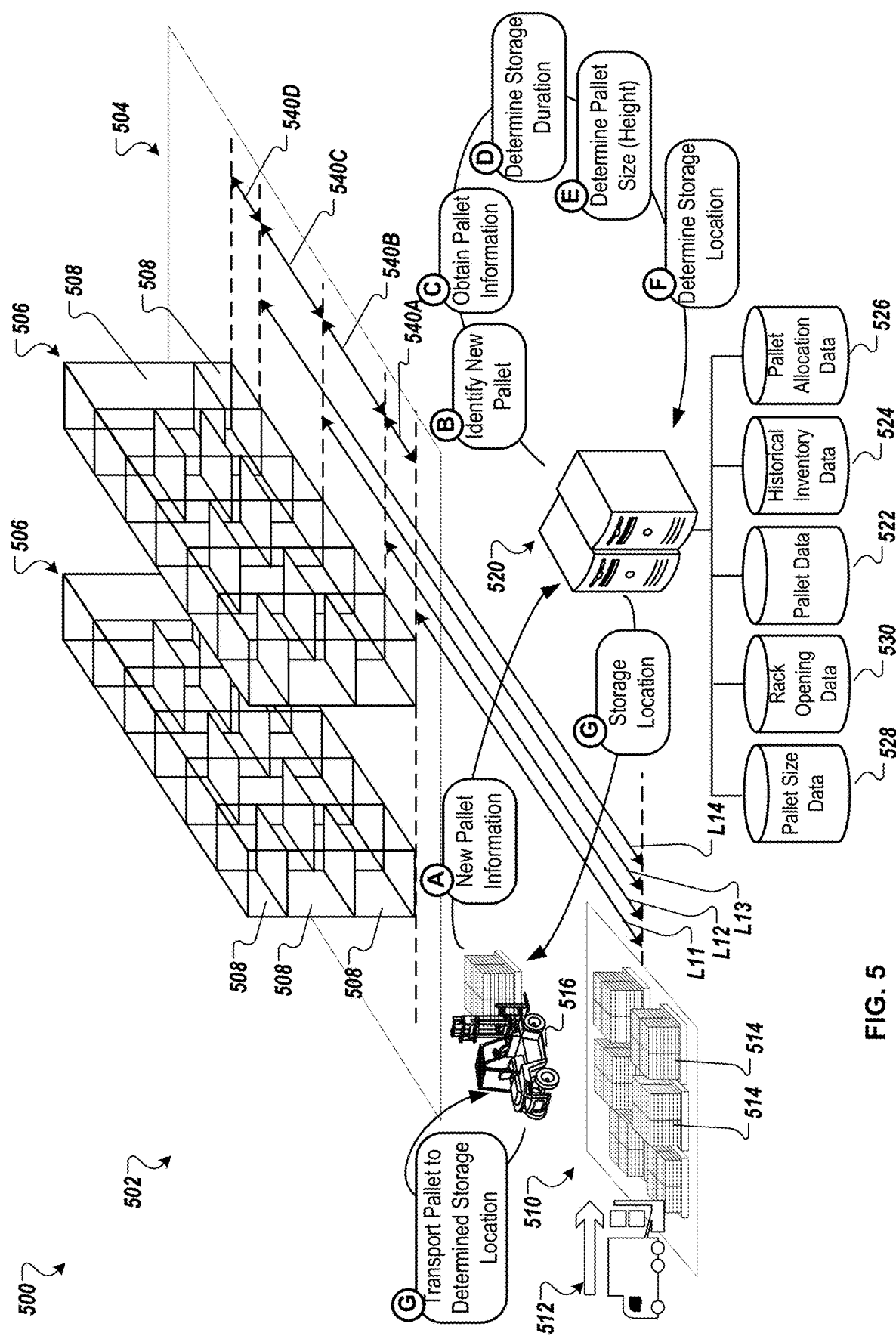
FIG. 5 illustrates an example system for optimizing pallet storage locations in a warehouse.

FIG. 5 illustrates an example system 500 for optimizing pallet storage locations in a warehouse 102. The system 500 is configured similarly to the system 100 in FIG. 1. For example, the system 500 can include a warehouse 502, a pallet storage area 504, a plurality of warehouse racks 506 with rack openings 508, a loading area 510, vehicles 512, and a computer system 520, which are similar to the warehouse 102, the pallet storage area 104, the plurality of warehouse racks 106 with the rack openings 108, the loading area 110, the vehicles 112, the computer system 120 in the system 100.

In this example, at least some of the warehouse racks 506 are heterogeneous warehouse racks having rack openings 508 of different sizes. The rack openings 508 can be varied to increase or maximize the use of the rack space (or to reduce or minimize the unused space) for the specific storage facility. In some implementations, the rack openings can be adjusted over time as the use of the facility changes over time (e.g., different products are stored at the warehouse, different companies or clients are using the warehouse).

The computer system 520 is configured to determine optimal locations for pallet storage in the pallet storage area 504 (e.g., rack openings in the warehouse racks 506) based at least in part on pallet data 522, historical inventory data 524, and/or pallet size data 528. Similarly to the pallet data 122 in FIG. 1, the pallet data 522 include information of pallets to be stored in the pallet storage area 504. Similarly to the historical inventory data 124 in FIG. 1, the historical inventory data 524 include historical data about pallets which have been delivered in and out, and stored in, the pallet storage area 504 over time. The pallet size data 528 include information of sizes of pallets to be stored in the pallet storage area 504, such as heights, widths, lengths, volumes, etc. In some implementations, the pallet size data 528 can be included in the pallet data 522. Similarly to the pallet data, the pallet size data 528 can be provided by a supplier of the new pallet as the pallet is transported to the warehouse. Alternatively, the pallet size data 528 can be obtained manually (e.g., by a worker who identifies the pallet and enters information about the pallet (e.g., a SKU) via a terminal that is communicatively connected to one or more computing devices. Alternatively, the pallet size data 528 can be obtained by scanning the pallet (e.g., scanning the barcode on the pallet) before or while the new pallet is moved by a forklift or other suitable vehicles in the warehouse.

The computer system 520 can determine an expected duration in which a pallet, such as a pallet 514 at the loading area 510, is stored in the pallet storage area 504 (e.g., a warehouse rack 506). The computer system 520 can use the pallet data 522 and/or the historical inventory data 524 to determine an expected pallet storage duration of a particular pallet, which can represent how long the pallet will stay for storage in the pallet storage area 504, or how soon the pallet will be removed from the pallet storage area 504 after being placed in the pallet storage area 504 (i.e., a pallet velocity).

Further, the computer system 520 can determine a size of the pallet to be stored in the pallet storage area 504 (e.g., a warehouse rack 506). The computer system 520 can retrieve the size of the pallet from the pallet size data 528. Alternatively, the computer system 520 can use the pallet data 522, the historical inventory data 524, and/or other suitable data to determine or predict the size (e.g., height) of a particular pallet.

The computer system 520 can determine optimal locations to store pallets in the pallet storage area 504 based in part on pallet allocation data 526, the pallet size data 528, and/or rack opening data 530. The pallet allocation data 526 can include rules for allocating identified pallets to desired locations (e.g., rack openings) in the pallet storage area 504. As described herein, the pallet allocation data 526 can include information that associates expected storage durations and/or sizes of pallets to locations (e.g., sections or rack openings) in the pallet storage area 504. For example, similarly to the pallet allocation data 126, the pallet allocation data 526 include information (e.g., a data table) that associates different pallet storage durations with different sections of the warehouse racks 506 in a way to reduce labor costs for transporting pallets to and from the warehouse racks 506. As illustrated in FIG. 5, the warehouse racks 506 can have different sections 540 (such as 540A-D) that are divided and arranged at different distances L (such L11-L14) from the source of pallets (e.g., the loading area 510). For example, first, second, third, and fourth sections 540A-D of the warehouse racks 506 are arranged at first, second, third, and fourth distances L11-L14, respectively, from the loading area 510 with the first section 540A being arranged closest to the loading area 510 and the fourth section 540D being arranged farthest from the loading area 510.

In addition to the pallet allocation data 526, the computer system 520 can further use the pallet size data 528 and the rack opening data 530 to determine optimal storage locations for pallets in the storage racks 506 with rack openings 508 of different sizes. The rack opening data 530 can include information about each rack opening, such as locations (e.g., distances from a particular area, such as a loading area), sections (e.g., percentile sections), sizes (e.g., heights), availability (e.g., whether the rack opening is currently being used or unused), and other data relating to pallet storage.

Considering expected storage duration and sizes of pallets, the computer system 520 can determine storage locations of the pallets that optimize both of labor cost saving and space utilization. In some implementations, the computer system 520 can determine an optimal storage location of a pallet using a cost function that reflects both pallet storage duration matching and pallet size matching. For example, the computer system 520 can calculate a cost value or score of each potential storage location (e.g., a rack opening) that is a function of pallet storage duration matching and pallet size matching. The pallet storage duration matching can indicate how close a potential storage location matches a particular pallet in terms of the pallet's storage duration (e.g., percentile). The pallet size matching can indicate how close a potential storage location matches the pallet in terms of the pallet's size (e.g., height). In some implementations, the components of the cost function can be weighted. For example, values of the pallet storage duration matching and the pallet size matching can be selectively weighted to reflect different needs, such as requiring more labor cost saving or more space utilization. For example, if the pallet size matching is more weighted than the pallet storage duration matching, the occupancy of the warehouse can increase by fitting pallets to rack openings with matching sizes (without having to place small pallets to larger rack openings to waste a space therein). On the other hand, if the pallet storage duration matching is more weighted than the pallet size matching, the labor costs can be saved more by placing pallets to predetermined corresponding sections of the warehouse racks.

Referring still to FIG. 5, the system 500 can identify the characteristics of pallets that are to be stored in a warehouse, determine optimal storage locations of the pallets in the warehouse, and transport the pallets to the determined storage locations for storage. For example, the computer system 520 can receive information about a new pallet 514 (Step A). In some implementations, the information about the new pallet 514 can be transmitted from a forklift 516 (or other vehicle) that picks up the new pallet for transportation. The new pallet 514 or the items thereon (e.g., a SKU) can be scanned before or after it is picked up by the forklift 516, and the scanned information can be transmitted to the computer system 520. In other implementations, the new pallet information can be obtained in other ways, such as provided by a supplier of the new pallet when the new pallet is delivered to the warehouse.

The computer system 520 can identify the new pallet 514 based on the received new pallet information (Step B). The computer system 520 can obtain pallet information about the new pallet 514 (Step C). For example, the computer system 520 can retrieve the pallet information from the pallet data 522. The pallet information includes facility, customer, product types, timing (e.g., day of the week, week of the year, etc.) in which pallets come in the warehouse, item description, seasonality, and other suitable information.

The computer system 520 can determine an expected storage duration of the new pallet 514 (Step D). The expected storage duration of the new pallet 514 can be determined based at least in part on the pallet information (e.g., the pallet data 522) and/or the historical inventory data associated with the warehouse. The computer system 520 can determine a size (e.g., height) of the pallet 514 (Step E). For example, the computer system 520 can obtain the pallet size from the pallet size data 528, which may or may not be part of the pallet data 522.

The computer system 520 can determine an optimal storage location according to the expected storage duration and the size of the new pallet 514 (Step F). The optimal storage location can be determined to optimize the labor costs (e.g., based on the expected storage duration) and the space usage (e.g., based on the pallet size) of the storage racks. The computer system 520 can transmit the optimal storage location to the forklift 516 (Step G), and the forklift 516 can transport the new pallet 514 and place it to the optimal storage location (e.g., the determined section of the warehouse rack) (Step H).

Figure 6:
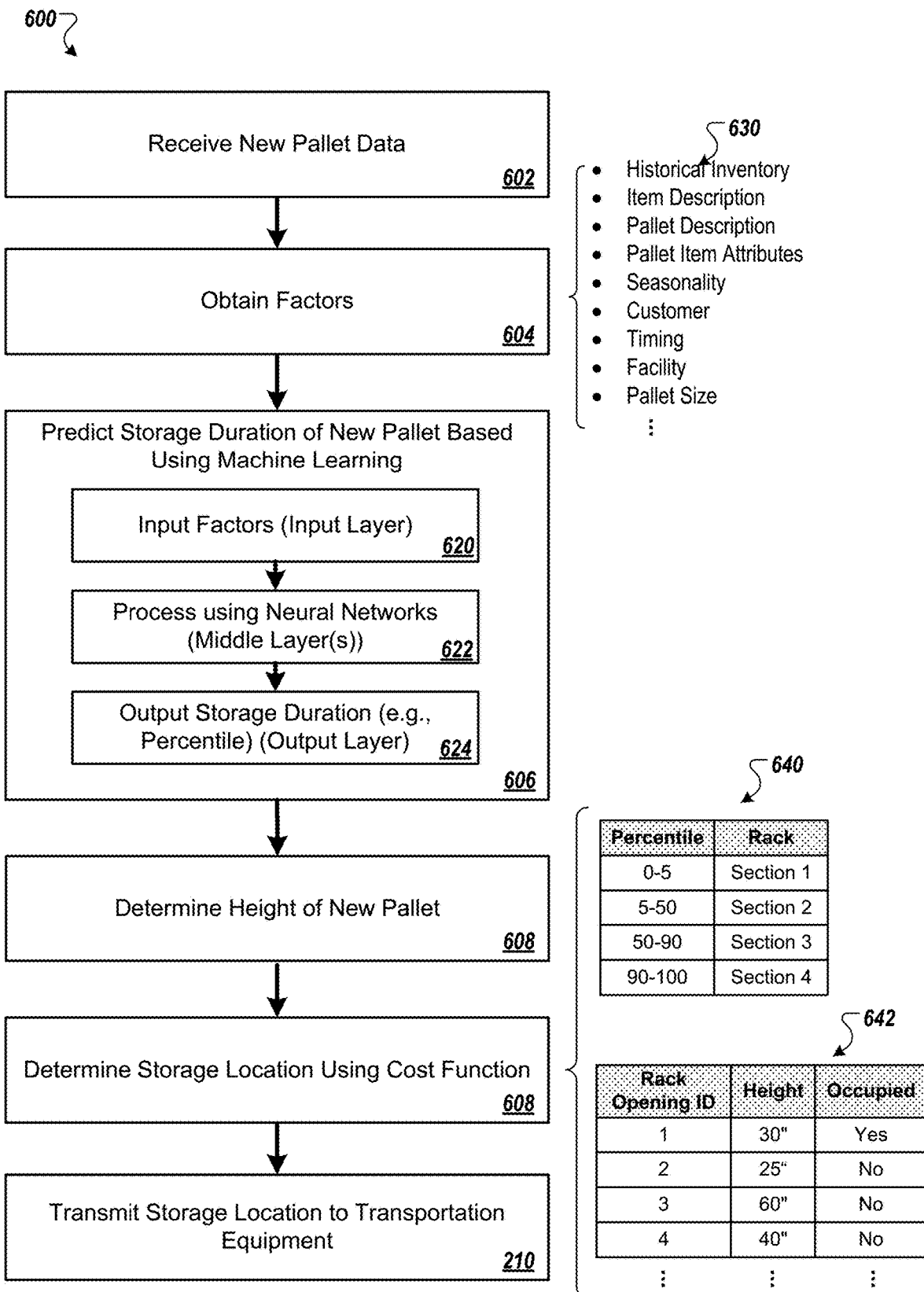
FIG. 6 is a flowchart of an example process for determining an optimal storage location of a pallet in a warehouse and placing it in the determined location.

FIG. 6 is a flowchart of an example process 600 for determining an optimal storage location of a pallet in a warehouse, and placing it in the determined location. The process 600 can begin by receiving new pallet data (Block 602). The new pallet data can be used to identify a new pallet that needs to be stored in a warehouse. The new pallet data can be provided by a supplier of the new pallet as the pallet is transported to the warehouse. Alternatively, the new pallet data can be obtained manually (e.g., by a worker who identifies the new pallet and enters information about the pallet (e.g., a SKU) via a terminal that is communicatively connected to one or more computing devices, such as the computer system 120. Alternatively, the new pallet data can be obtained by scanning the pallet (e.g., scanning the barcode on the pallet) before or while the new pallet is moved by a forklift or other suitable vehicles in the warehouse. The new pallet data can be saved as the pallet data 522 in FIG. 5.

The process 600 can further include obtaining a variety of factors 630 associated with the new pallet (Block 604). The factors include one or more of historical inventory information, pallet item attributes (e.g., product types, seasonality, etc.), customer of the pallet, timing information (e.g., day of the week, week of the year, etc. in which the pallet is delivered in and out the warehouse), facility information (e.g., type of facility, operational conditions, etc.), pallet description, pallet item description, pallet size, and other relevant information.

Historical inventory information can include information storage of pallets of the same or similar kind and/or pallets for the same or similar customer over a predetermined period of time in the past, or over the entire time of storage at the facility in the past. In addition or alternatively, the historical inventory information can include historical data for pallets of different kind and/or pallets for different customers can be used for prediction. Historical performance of pallet storage for the same customer and/or different customers over time can be considered to generate prediction of a storage duration of a particular pallet to be stored in the warehouse.

Item description can indicate a human-readable description about items in the pallet, such as "6 ounce strawberry puree." The item description can be parsed to a machine-understandable language using, for example, natural language processing so that the item description can be used to predict a storage duration of the pallet in the warehouse.

The process 600 can include predicting an expected storage duration of the new pallet (Block 606). For example, the expected storage duration can be predicted using a machine learning algorithm. Various machine learning algorithms can be used for prediction. Some example machine learning algorithms used for prediction employ artificial neural networks with multiple layers, such as an input layer, one or more middle layers, and an output layer. In some implementations, prediction of the expected storage duration can be performed by the input layer that receives a variety of factors associated with the new pallet as inputs (Block 620), the middle layers that process the inputs (Block 622), and the output layer that generates a storage duration of the pallet (Block 624). As described herein, the storage duration of the pallet can be represented as a percentile of the pallet for storage duration in the warehouse.

The process 600 can include determining a size of the new pallet (Block 608). A height of the new pallet can be primarily considered to determine whether and/or how the new pallet can fit in a rack opening of a storage rack. In some implementations, the size of the new pallet can be obtained from the factors 630.

The process 600 can include determining an optimal storage location using a cost function (Block 610). Some example cost function is configured to optimize a labor cost for delivering pallets to and from a pallet storage area (e.g., an area where one or more racks are located), and a cost for utilizing the space of the pallet storage area (e.g., a cost for using the racks with used and unused rack openings). In some implementations, with respect to a particular pallet, the cost for each location in the pallet storage area, such as each rack opening (or each unoccupied rack opening) in the storage racks, can be calculated based on storage duration matching and storage size matching. Storage duration matching relates to how suitable the location (e.g., rack opening) in the pallet storage area is for an expected storage duration (e.g., percentile) of the pallet to save labor costs. Storage size matching relates to how suitable the location (e.g., rack opening) in the pallet storage area is for the size (e.g., height) of the pallet to maximize the space utilization in the storage area.

Storage duration matching can be determined using pallet allocation data 640. The pallet allocation data 640 can be saved as the pallet allocation data 526 in FIG. 5. In some implementations, the pallet allocation data 640 provide rules as a table that maps ranges of pallet storage durations (e.g., percentiles) with storage locations (e.g., sections of a rack). By way of example, if a new pallet is predicted to have 25 percentile of storage duration, the new pallet is determined to match Section 2 of the rack, using the illustrated pallet allocation data 640.

Storage size matching can be determined using rack opening data 642. The rack opening data 642 can saved as the rack opening data 530 in FIG. 5. The rack opening data 642 can provide the size (e.g., height) of each rack opening in one or more racks. The rack opening data 642 can further provide availability of each rack opening, such as whether the rack opening is open to store a pallet, or has been occupied and not available for another pallet.

The process 600 can include transmitting the determined storage location to transportation equipment, such as a forklift, so that the new pallet is transported and placed to the determined storage location for storage in the warehouse (Block 612).

Figure 7:
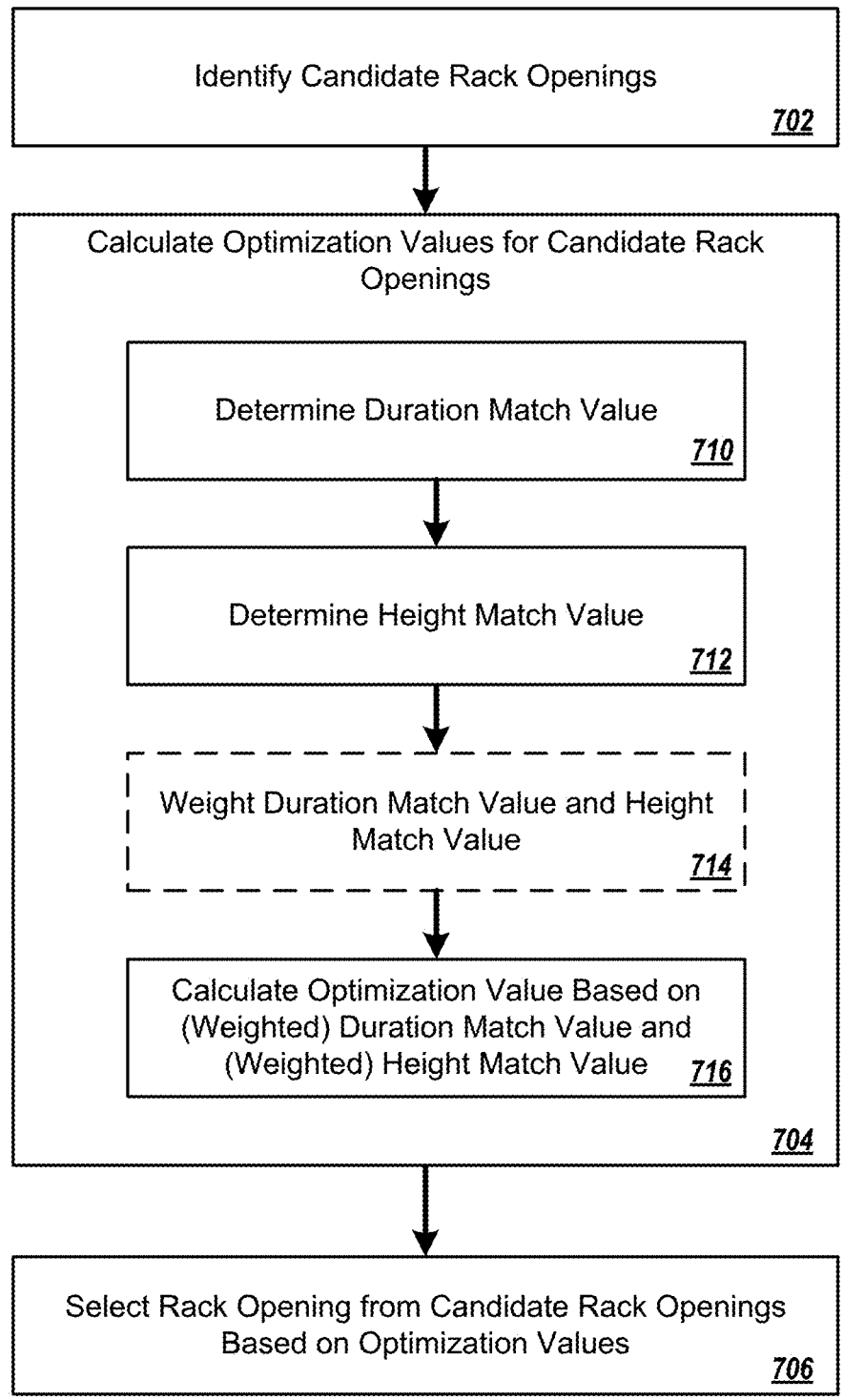
FIG. 7 is a flowchart of an example process for selecting an optimal rack opening for a pallet in a warehouse.

FIG. 7 is a flowchart of an example process 700 for selecting an optimal rack opening for a pallet in a warehouse. The process 700 can include identifying a plurality of candidate rack openings in one or more storage racks (Block 702). The candidate rack openings can be rack openings that are not currently occupied and thus available to store pallets. The candidate rack openings can be determined based on rack opening data, such as the rack opening data 530, 642.

The process 700 can include calculating optimization values for the candidate rack openings (Block 704). In some implementations, an optimization value for each of the candidate rack openings can be calculated by determining a storage duration match value (Block 710), determining a storage height match value (Block 712), and calculating the optimization value based on the storage duration match value and the storage height match value (Block 716). The storage duration match value can indicate whether an expected storage duration of the pallet matches a storage duration range that is assigned to the candidate rack opening, or how close the expected storage duration of the pallet is to the storage duration range assigned to the candidate rack opening. The storage height match value can indicate whether the height of the pallet matches a height of the candidate rack opening, or how close the pallet fits in the candidate rack opening (e.g., how close the height of the pallet is to the height of the candidate rack opening).

The optimization value can be calculated using a predetermined function of the storage duration match value and the storage height match value. For example, the optimization value can be a sum of the storage duration match value and the storage height match value.

The storage duration match value, the storage height match value, and the optimization value can be represented in various forms and/or scales. For example, such values can be represented as scores either scaled or unscaled. In other examples, the optimization values can be represented as binary numbers, indicators, symbols, etc.

In some implementations, the storage duration match value and/or the storage height match value can be weighted to calculate the optimization value (Block 714). Weights on the storage duration match value and/or the storage height match value can be adjusted to meet various purposes. For example, if labor cost saving is more of concern, the storage duration match value may be more weighted than the storage height match value. If space utilization if more of concern, the storage height match value may be more weighted than the storage duration match value. An example weighted cost function for an optimization value can be:

$$f(x)=CX(x)+(1-C)Y(x)$$

where x is a pallet, $f$ is an optimization value, X is a storage duration match value, Y is a height match value, and C is a weight value.

The process 700 can include selecting a rack opening for the pallet from the candidate rack openings based on the calculated optimization values (Block 706). For example, one of the candidate rack openings that has the highest optimization value can be considered as an optimal rack opening and selected as the rack opening for the pallet. In other examples, multiple ones of the candidate rack openings that have optimization values that meet a threshold value (e.g., greater than the threshold value) can be considered as multiple optimal rack openings, and any one of the multiple optimal rack openings can be selected as the rack opening for the pallet. Depending on the cost function and/or scoring scheme, the optimal rack openings can have either highest or lowest optimization values, or values that are either greater or less than the threshold value.

In addition to, or alternatively to, the duration match and/or the height match, other factors can also be used to calculate optimization values and/or selecting rack openings. For example, the optimization values can be calculated, and/or rack openings can be selected, such that identical items are placed together or close each other in the rack. In another example, the optimization values can be calculated, and/or rack openings can be selected, such that items that are to be shipped together are placed to be grouped in the rack. Other factors are also possible.

In some implementations, p-norm can be used for calculation. The intuition here is "calculating distance over multiple metrics." Various types of norm can be used according to the value of p. For example, p=1 is "Manhattan/Taxicab" distance, p=2 is "as the crow flies" distance, and p=3 is "as the crow flies but avoiding all McDonalds franchises." Other p-values are used for calculation in other examples. In other implementations, other distance metrics can be used for calculation.

Figure 8:
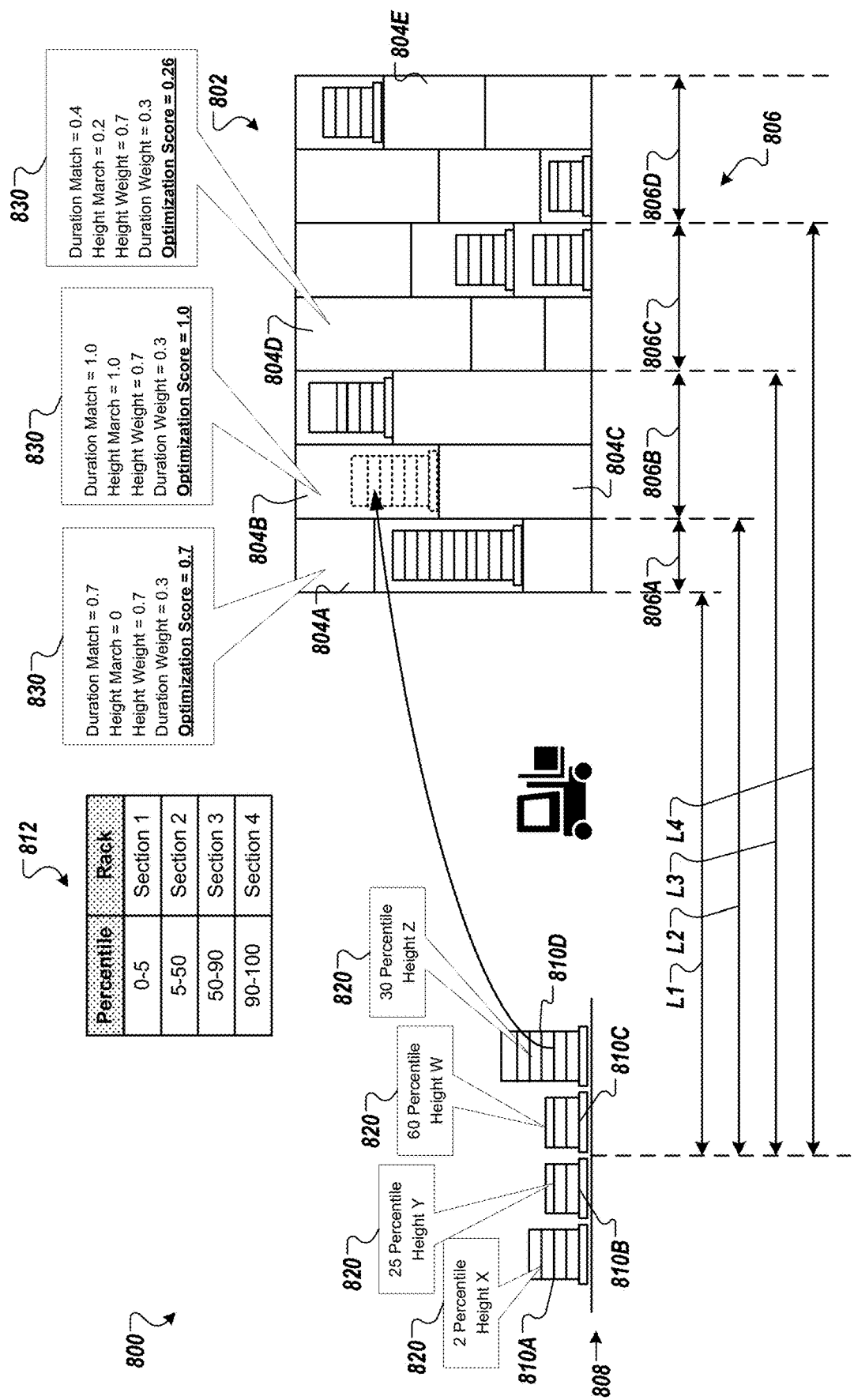
FIG. 8 illustrates an example process for determining an optimal storage location of a new pallet based on an expected storage duration of the new pallet.

FIG. 8 illustrates an example process 800 for determining an optimal storage location of a new pallet based on an expected storage duration of the new pallet. In this example, a storage rack 802, as presented in its side view, is arranged such that the rack openings 804 are varied to increase or maximize the use of the rack space, or to reduce or minimize the unused space, for the specific storage facility. In some implementations, the rack openings 804 can be adjusted over time as the use of the facility changes over time (e.g., different products are stored at the warehouse, different companies or clients are using the warehouse).

The storage rack 802 has a plurality of sections 806 (including 806A-D) arranged at different distances from a loading area 808 where pallets 810 are ready to be transported to the storage rack 802. In the illustrated example, the storage rack 802 has four sections arranged by distance from the loading area 808. In particular, first, second, third, and fourth sections 806A-D are arranged at first, second, third, and fourth distances L11-L14, respectively, from the loading area 808. The first distance L11 is shorter than the second distance L12, the second distance L12 is shorter than the third distance L13, and the third distance L13 is shorter than the fourth distance L14.

Each of the rack sections 806 is assigned to a particular range of pallet storage duration. Such assignment can be predetermined and stored as pallet allocation data or rules 812 (e.g., the pallet allocation data 640). In some implementations, a short storage duration of a pallet indicates a short turnaround of the pallet (e.g., the pallet is delivered in and out of the warehouse within a short period of time). Thus, a shorter storage duration can be mapped to a rack section 806 that is closer to the loading area 808 so that racks with quicker turnaround can be stored closer to the loading area 808, thereby saving labor costs in delivering in and out of the warehouse rack. By way of example, as illustrated, the first section 806A is assigned to a pallet storage duration between 0 and 5 percentile, the second section 806B is assigned to a pallet storage duration between 5 (including 5) and 50 percentile, the third section 806C is assigned to a pallet storage duration between 50 (including 50) and 90 percentile, and the fourth section 806D is assigned to a pallet storage duration between 90 (including 90) and 100 percentile.

The pallets 810 that are to be delivered to the rack can be identified, and allocation data 820 of each pallet can be determined as described herein. For example, the allocation data 820 of a particular pallet can include an expected storage duration of the pallet (e.g., in terms of percentile) and a size (e.g., height) of the pallet.

When a particular pallet to be delivered and stored in the rack is identified, rack opening data 830 for each rack opening 804 that is unoccupied and thus potentially available for the pallet is generated as described herein. For example, the rack opening data 830 can include an optimization value of each rack opening with respect to the pallet. For example, the optimization value can be calculated based on a storage duration match value and a storage height match value, which may or may not be weighted. In the illustrated example, for a pallet 810D, a rack opening 804B provides a highest optimization value (e.g., 1.0) among several candidate rack openings (including 804A-E), and can thus be selected as an optimal rack opening for the pallet 810D.

Figure 9:
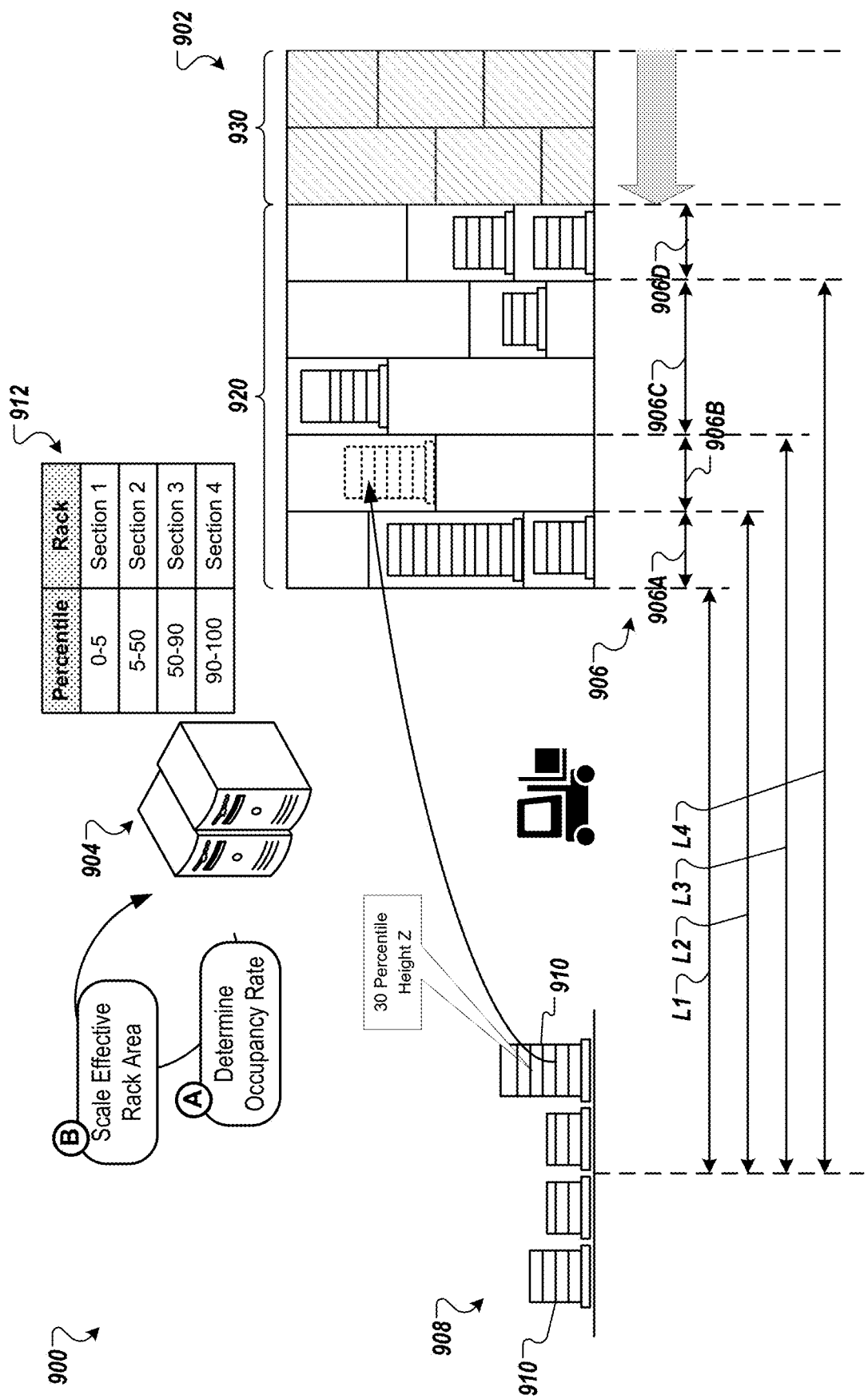
FIG. 9 illustrates an example technology for scaling a pallet storage area depending on an occupancy of the area.

FIG. 9 illustrates an example technology 900 for scaling a pallet storage area, such as one or more storage racks 902, depending on an occupancy of the area. For example, a computer system 904 can determine an occupancy rate of the storage racks 902 (Step A), and scale the storage racks 902 based on the occupancy rate (Step B). The occupancy rate can be determined to reflect an occupancy at various times, such as at a predetermined past time, at a current time, or at a predetermined future time. In some implementations, the occupancy rate can be determined or predicted based on the current inventory, the historical inventory, and/or various other factors.

When an occupancy rate of the storage racks 902 is determined, an effective area 920 of the storage racks 902 can be adjusted based on the occupancy rate, thereby increasing the space utilization of the storage racks. By way of example, if the storage racks are expected to be occupied only 75% for a predetermined period of time in the future, the effective area 920 of the storage racks 902 can be reduced to a half of the storage racks 902, and the sections 906A-D of the storage racks can be scaled to the reduced effective area 920. The remaining area 930 of the storage racks 902 are unused. To maximize a labor cost saving, the effective area and the scaled sections of the storage racks 902 can be arranged at the front part of the storage racks 902 close to the loading area 908.

Figure 10:
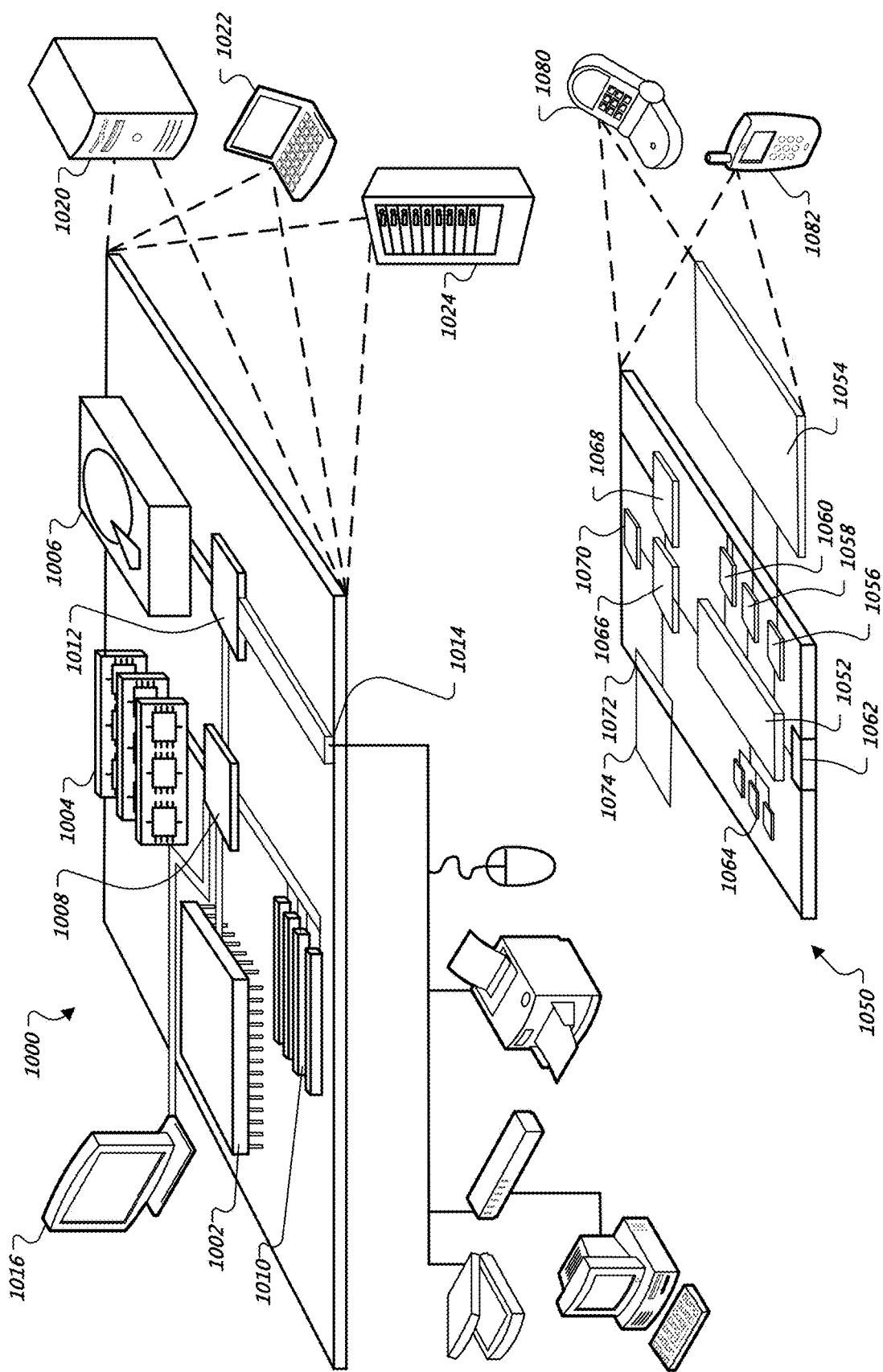
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provided, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for managing a plurality of pallets in a warehouse, the system comprising:
    a plurality of storage racks having a plurality of rack openings;
    a database that is programmed to store pallet allocation data that associate pallet storage duration with a plurality of sections of the storage racks, the plurality of sections being arranged by distance from an entrance of the warehouse and mapped to the pallet storage durations, wherein the plurality of storage racks includes one or more horizontal bars adjustable along a plurality of elevations on the storage racks to define the plurality of rack openings within the storage racks; and
    a computer system including one or more processors that are programmed to perform operations including:
    identifying a pallet delivered to the warehouse;
    determining an expected storage duration of the pallet in the warehouse;
    determining a height of the pallet;
    determining a storage location of the pallet in the warehouse based on the expected storage duration and the height of the pallet;
    transmitting information identifying the storage location to equipment for placement of the pallet;
    identifying a plurality of candidate rack openings that are available in the storage racks;
    calculating optimization values for the candidate rack openings based on the expected storage duration and the height of the pallet; and
    determining a rack opening from the candidate rack openings having an optimization value exceeding a threshold value, the rack opening being the storage location for the pallet,
    wherein each of the optimization values includes a combination of a duration match value and a height match value for each of the candidate rack openings, wherein the duration match value for a candidate rack opening represents proximity in distance between a section of the storage racks suited for the expected storage duration of the pallet and a section of the storage racks to which the candidate rack opening belongs, and wherein the height match value for the candidate rack opening represents proximity in measurement between the height of the pallet and a height of the candidate rack opening.

2. The system of claim 1, wherein determining the expected storage duration of the pallet comprises:
    determining a duration percentile of the pallet.

3. The system of claim 1, wherein the expected storage duration of the pallet is determined based on historical inventory data, the historical inventory data identifying pallets stored in the warehouse, times at which the pallets were stored, and durations in which the pallets were stored.

4. The system of claim 1, wherein determining the expected storage duration of the pallet comprises:
    predicting the expected storage duration using a machine learning based on a plurality of input factors.

5. The system of claim 4, wherein the input factors include at least one of a type of items contained in the pallet, a customer of the pallet, a day of week, a week of year, a pallet description, an item description, and historical inventory data.

6. The system of claim 1, wherein determining the storage location of the pallet in the warehouse comprises:
    determining an area of the warehouse based on a travel distance of the pallet, the travel distance corresponding to the expected storage duration.

7. The system of claim 1, wherein determining the storage location of the pallet in the warehouse comprises:
    determining an area at a distance from an entrance of the warehouse based on the expected storage duration.

8. The system of claim 1, wherein the plurality of sections are mapped to different pallet duration percentiles, wherein the expected storage duration is identified as a first pallet duration percentile of the pallet duration percentiles, and wherein the storage location is a first section of the plurality of sections, the first section being mapped to the first pallet duration percentile.

9. The system of claim 1, wherein the plurality of sections includes a first section and a second section being arranged farther from the entrance of the warehouse than the first section, the first section mapped to a first percentile, and the second section mapped to a second percentile greater than the first percentile.

10. The system of claim 1, wherein determining a storage location of the pallet in the warehouse includes:
    determining one of the plurality of sections in the storage racks and one of the rack openings in the storage racks based on a cost function of the expected storage duration of storage and the height of the pallet.

11. The system of claim 1, wherein the duration match value and the height match value are inversely weighted.

12. The system of claim 1, wherein the equipment comprises a forklift that includes a user interface programmed to automatically output the information identifying the storage location in response to receiving the transmitted information.

13. A computer-implemented method for managing a plurality of pallets in a warehouse, the method comprising:
    identifying, using at least one computing device, a pallet delivered to the warehouse;
    accessing, using the at least one computing device, a database that is programmed to store pallet allocation data that associate pallet storage durations with a plurality of sections of the storage racks;

determining, using the at least one computing device, an expected storage duration of the pallet in the warehouse;

determining, using the at least one computing device, a height of the pallet;

determining, using the at least one computing device, a storage location of the pallet in the warehouse based on the expected storage duration, the height of the pallet, and the pallet allocation data; and transmitting, using the at least one computing device, information identifying the storage location to equipment for placement of the pallet, wherein the warehouse includes the plurality of sections arranged by distance from an entrance of the warehouse, wherein the warehouse includes a plurality of storage racks, each rack having the plurality of sections, the plurality of sections being mapped to the pallet storage durations, wherein the plurality of storage racks includes one or more horizontal bars adjustable along a plurality of elevations on the storage racks to define a plurality of rack openings within the storage racks, wherein the method further comprises:
identifying a plurality of candidate rack openings that are available in the storage racks;
calculating optimization values for the candidate rack openings based on the expected storage duration and the height of the pallet; and
determining a rack opening from the candidate rack openings having an optimization value exceeding a threshold value, the rack opening being the storage location for the pallet, wherein each of the optimization values includes a combination of a duration match value and a height match value for each of the candidate rack openings, wherein the duration match value for a candidate rack opening represents proximity in distance between a section of the storage racks suited for the expected storage duration of the pallet and a section of the storage racks to which the candidate rack opening belongs, and wherein the height match value for the candidate rack opening represents proximity in measurement between the height of the pallet and a height of the candidate rack opening.

14. The method of claim 13, wherein the plurality of sections are mapped to different pallet duration percentiles, wherein the expected storage duration is identified as a first pallet duration percentile of the pallet duration percentiles, and wherein the storage location is a first section of the plurality of sections, the first section being mapped to the first pallet duration percentile.

15. The method of claim 13, wherein the plurality of sections includes a first section and a second section being arranged farther from the entrance of the warehouse than the first section, the first section mapped to a first percentile, and the second section mapped to a second percentile greater than the first percentile.

16. The method of claim 13,
wherein determining the storage location of the pallet in the warehouse includes:
determining one of the plurality of sections in the storage racks and one of the rack openings in the storage racks based on a cost function of the expected storage duration and the height of the pallet.

17. The method of claim 13, wherein the duration match value and the height match value are inversely weighted.

* * * * *

UNITED STATES PATENT AND TRADEMARK OFFICE
CERTIFICATE OF CORRECTION

PATENT NO. : 10,796,278 B1
APPLICATION NO. : 16/688922
DATED : October 6, 2020
INVENTOR(S) : Daniel Thomas Wintz et al.

Page 1 of 1

It is certified that error appears in the above-identified patent and that said Letters Patent is hereby corrected as shown below:

In the Claims

In Column 24, Line 54, Claim 10, delete "of storage and" and insert -- and --, therefor.

Signed and Sealed this
Fourth Day of October, 2022

Katherine Kelly Vidal
*Director of the United States Patent and Trademark Office*